United States Patent Office 3,752,869
Patented Aug. 14, 1973

3,752,869
S-(N-ISOBUTYNYL-N-PHENYLCARBAMOYL-METHYL) DITHIOPHOSPHATES
Karl Kiehs, Lampertheim, and Adolf Fischer, Mutterstadt, Germany, assignors to Badische Anilin- & Soda-Fabrik Aktiengesellschaft, Ludwigshafen am Rhine, Germany
No Drawing. Filed Oct. 15, 1970, Ser. No. 81,141
Claims priority, application Germany, Oct. 18, 1969, P 19 52 650.2
Int. Cl. A01n 9/36; C07f 9/16
U.S. Cl. 260—943       3 Claims

ABSTRACT OF THE DISCLOSURE

New and valuable thiophosphoric esters which have a good herbicidal action and a process for controlling the growth of unwanted plants with these compounds.

---

The present invention relates to new and valuable phosphoric esters and herbicides containing these compounds.

It is known to use N-isopropyl chloroacetic acid anilide as a herbicidal active ingredient; however, its action is unsatisfactory.

We have now found that phosphoric esters having the Formula I

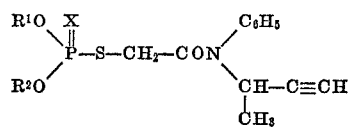

where $R^1$ and $R^2$ are identical or different and each denotes lower alkyl, alkenyl, alkoxyalkyl or cycloalkyl having up to 6 carbon atoms (e.g., methyl, ethyl, n-propyl, isopropyl, allyl, propargyl, methoxyethyl, ethoxyethyl, cyclopentyl, cyclohexyl) or aryl, preferably phenyl, $R^1$ and $R^2$ together with the oxygen atoms and the phosphorus atom whose substituents they are may also form a 5- or 6-membered heterocycle, and X denotes sulfur or oxygen, having a good herbicidal action.

The compounds are valuable herbicidal active ingredients, especially for use as selective herbicides in crop plants such as cotton.

The active ingredients may be prepared by reacting salts of O,O-diesters of thiophosphoric acids or dithiophosphoric acids with N-isobutynyl chloroacetanilide. Preferred salts are alkali metal salts (Na, K) or $R^3NH$ salts, R denoting hydrogen, methyl, ethyl, isopropyl or n-propyl. These salts may also be prepared during the reaction with the chloroacetamide from the corresponding acid and the appropriate alkalis or amines.

The reaction proceeds sufficiently rapidly not only in inert organic solvents such as ketones, ethers, aliphatic or aromatic hydrocarbons, but also in water or mixtures of water and one or more than one of the said organic solvents. Suitable reaction temperatures are those within the range of from room temperature to the boiling point of the solvent used; however, it is preferred to maintain a temperature of from 40° to 120° C.

EXAMPLE 1

Preparation of O,O-diethyl-S-(N-isobutynyl-N-phenylcarbamoylmethyl)dithiophosphoric acid 10.8 parts by weight of the ammonium salt of O,O-diethyldithiophosphoric acid and 11.1 parts of N-isobutynyl chloroacetanilide are dissolved in a mixture of 50 parts of acetone and 10 parts of water. The solution is heated for 4 hours at 60° C., cooled, and diluted with water, and the product is dissolved in toluene or methylene chloride. The organic phase is washed once with a 5 wt. percent aqueous sodium carbonate solution and several times with water. The solution is dried over sodium sulfate and concentrated at less than 70° C. in a vacuum, finally under an oil pump vacuum. 16.3 parts of the above compound is obtained as a weakly yellow oil. $n_D^{25}$: 1.5540.

Calc'd (percent): N, 3.77; S, 17.25; P, 8.36. Found (percent): N, 3.6; S, 17.0; P, 8.3.

EXAMPLE 2

Preparation of O,O-diethyl-S-(N-isobutynyl-N-phenyl-carbamoylmethyl)thiophosphoric acid Adopting the procedure employed in Example 1, 15.1 parts of the above compound is obtained from 99 parts of the ammonium salt of O,O-diethylthiophosphoric acid and 11.1 parts of N-isobutynyl chloroacetanilide. $n_D^{25}$: 1.5273.

Calc'd (percent): N, 3.95; S, 9.0; P, 8.73. Found (percent): N, 3.8; S, 8.8; P, 8.7.

The following compounds are examples of other active ingredients having the general Formula I

| $R^1$ | $R^2$ | X | |
|---|---|---|---|
| $CH_3$ | $CH_3$ | S | M.P. 58°–60° C. |
| $CH_3$ | $CH_3$ | O | M.P. 74°–76° C. |
| $i\text{-}C_3H_7$ | $i\text{-}C_3H_7$ | O | $n_D^{25}$ 1.5186 |
| $i\text{-}C_3H_7$ | $i\text{-}C_3H_7$ | S | M.P. 51°–53° C. |
| $n\text{-}C_4H_9$ | $n\text{-}C_4H_9$ | S | |
| $CH_2=CH-CH_2$ | $CH_2=CH-CH_2$ | S | $n_D^{25}$ 1.5612 |
| $C_2H_5O-CH_2-CH_2$ | $C_2H_5O-CH_2-CH_2$ | S | |
| ⟨cyclopentyl⟩ | ⟨cyclopentyl⟩ | S | |
| ⟨cyclohexyl⟩H | ⟨cyclohexyl⟩H | S | $n_D^{25}$ 1.5535 |
| $C_6H_5$ | $C_6H_5$ | S | $n_D^{25}$ 1.6030 |

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150° C., e.g. tetrahydronaphthalene or alkylated naphthalenes, or organic liquids having boiling points higher than 150° C. and having one or more than one functional group, e.g. the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersion agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

For the following comparative experiments the active ingredients given below are used:

(I)
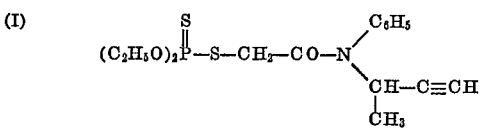

according to the invention;

(II) 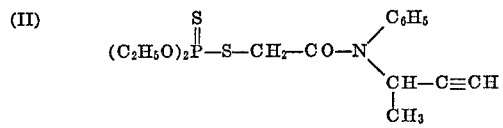

according to the invention;

(III) 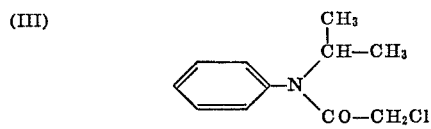

prior art compound.

EXAMPLE 3

In a greenhouse, loamy sandy soil is filled into pots and sown with the seeds of *Glycine hispida, Gossypium herbaceum, Echinochloa crus-galli, Setaria viridis, Poa annua* and *Poa trivialis*. The soil prepared in this manner is then treated with 3 kg. per hectare of each of the active ingredients I, II and III, each active ingredient being dispersed in 500 liters of water per hectare. After 4 to 5 weeks, it is observed that active ingredients I and II have a stronger herbicidal action than III on grassy and dicotyledonous weeds combined with the same good crop plant compatibility.

The results of the experiment are given in the following table:

| Active ingredient | I | II | III |
|---|---|---|---|
| Crop plants: | | | |
| Glycine hisida | 15 | 10 | 15 |
| Gossypium herbaceum | 5 | 5 | 5 |
| Unwanted plants: | | | |
| Echinochloa crus-galli | 95 | 100 | 75 |
| Setariaviridis | 100 | 100 | 80 |
| Poa annua | 90 | 100 | 75 |
| Poa trivialis | 90 | 95 | 70 |

NOTE.—0=no damage; 100=complete destruction.

EXAMPLE 4

In a greenhouse, the plants *Gossypium herbaceum, Glycine hispida, Brassica oleracea, Echinochloa crus-galli, Poa annua* and *Dactylis glomerata* are treated at a growth height of 2 to 12 cm. with 3 kg. per hectare of active ingredient II dispersed in 500 liters of water per hectare. After 10 to 14 days, the grassy weeds begin to wither and after 3 to 4 weeks the grassy weeds *Echinochloa crus-galli, Poa annua* and *Dactylis glomerata* have withered, whereas the crop plants *Gossypium herbaceum, Glycine hispida* and *Brassic oleracea* continue to grow undamaged.

The action of the following compounds corresponds to that of I and II in Examples 3 and 4:

O,O-dimethy-S-(N-butyn-1-yl-(3)-N-phenylcarbomyl-methyl)-dithiophosphoric acid;
O,O-dimethy-S-(N-butyn-1-yl-(3)-N-phenylcarbomyl-methyl)thiophosphoric acid;
O,O-diphenyl-S-(N-butyn-1-yl-(3)-N-phenylcarbamoyl-methyl)-dithiophosphoric acid;
O,O-diallyl-S-(N-butyn-1-yl-(3)-N-phenylcarbamoyl-methyl)-dithiphosphoric acid.

EXAMPLE 5

70 parts of weight of compound 1 from Example 3 is mixed with 30 parts by weight of N-methyl-α-pyrrolidone. A mixture is obtained which is suitable for application in the form of very fine drops.

EXAMPLE 6

20 parts by weight of compound II from Example 3 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecyl-benzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 7

20 parts by weight of compound I from Example 3 is dissolved in a mixture consisting of 40 parts by weight of cyclohexanone, 30 parts by weight of isobutanol, 20 parts by weight of the adduct of 7 moles of ethylene to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained 0.02% by weight of the active ingredient.

EXAMPLE 8

20 parts by weight of compound II from Example 3 is dissolved in a mixture consisting of 25 parts by weight of cyclohexanol, 65 parts by weight of a mineral oil fraction having a boiling point between 210° and 280° C., and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 9

20 parts by weight of compound I from Example 3 is well mixed with 3 parts by weight of the sodium salt of diisobutylnaphthalene-α-sulfonic acid, 17 parts by weight of the sodium salt of a lignin-sulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 10

3 parts by weight of compound II from Example 3 is intimately mixed with 97 parts by weight of particular kaolin. A dust is obtained containing 3% by weight of the active ingredient.

EXAMPLE 11

30 parts by weight of compound I from Example 3 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:

1. Phosphoric esters of the formula $$\begin{array}{c} R^1O \\ \diagdown \\ R^2O \end{array} \overset{X}{\underset{\|}{P}} -S-CH_2-CO-N \begin{array}{c} C_6H_5 \\ \diagdown \\ CH-C\equiv CH \\ | \\ CH_3 \end{array}$$

where $R^1$ and $R^2$ are identical or different and each denotes lower alkyl, alkenyl, alkoxyalkyl or cycloalkyl having up to 6 carbon atoms, or phenyl, and X denotes sulfur or oxygen.

2.
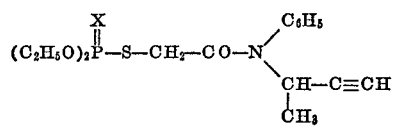
3.
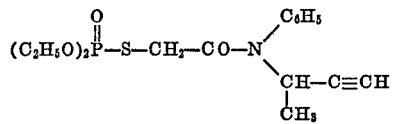
References Cited
UNITED STATES PATENTS
3,102,019  8/1963  Speziale et al. _____ 260—943 X
3,134,801  5/1964  Sehring et al. _____ 260—943
LEWIS GOTTS, Primary Examiner
A. H. SUTTO, Assistant Examiner
U.S. Cl. X.R.
71—87

UNITED STATES PATENT OFFICE
CERTIFICATE OF CORRECTION

Patent No. 3,752,869          Dated August 14, 1973

Inventor(s) Karl Kiehs and Adolf Fischer

It is certified that error appears in the above-identified patent and that said Letters Patent are hereby corrected as shown below:

Column 3, line 34, "hisida" should read -- hispida --; line 37, "Setariaviridis" should read -- Setaria viridis --; lines 56 to 59, "O,O-dimethy-S-(N-butyn-1-yl-(3)-N-phenylcarbomyl-methyl)-dithiophosphoric acid;
   O,O-dimethy-S-(N-butyn-1-yl-(3)-N-phenylcarbomyl-methyl)thiophosphoric acid;" should read -- O,O-dimethyl-S-(N-butyn-1-yl-(3)-N-phenylcarbamoyl-methyl)-dithiophosphoric acid;
   O,O-dimethyl-S-(N-butyn-1-yl-(3)-N-phenylcarbamoyl-methyl)-thiophosphoric acid; --.

Column 4, line 19, "obtained 0.02%" should read -- obtained containing 0.02% --.

Column 5, claim 2 should read

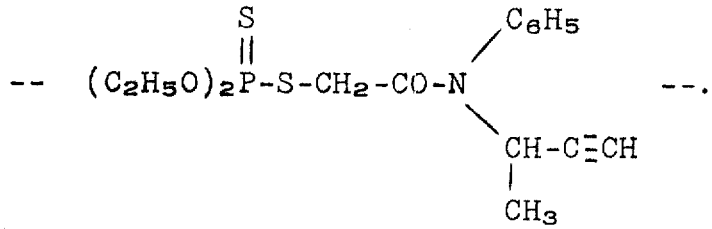

Signed and sealed this 27th day of November 1973.

SEAL)
ttest:

DWARD M. FLETCHER, JR.
ttesting Officer

RENE D. TEGTMEYER
Acting Commissioner of Patents